J. A. COFFEY.
Alcohol Still.
No. 60,477.          Patented Dec. 18, 1866.
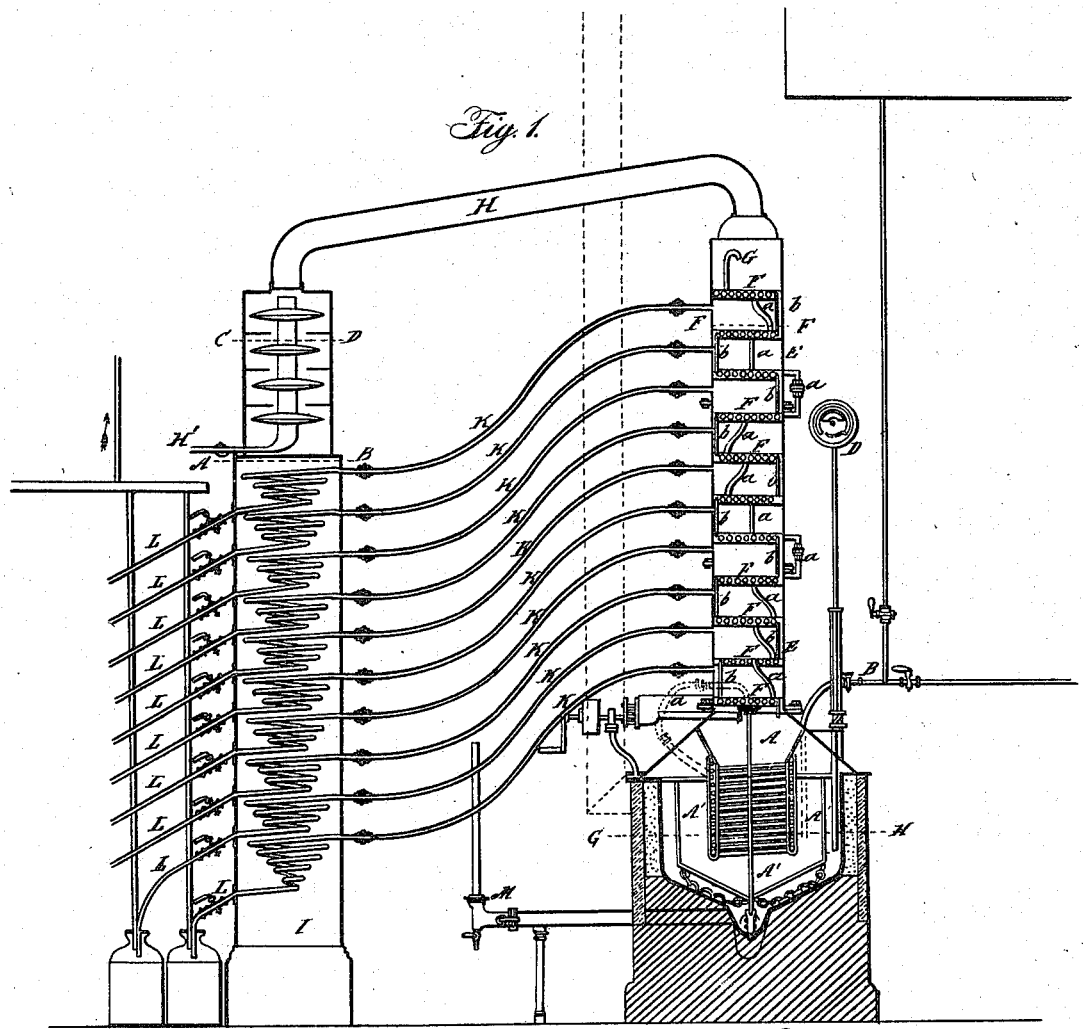
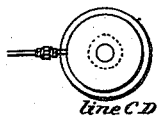
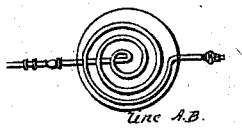
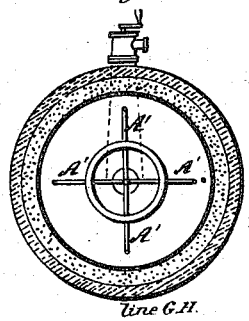
Witnesses:
Inventor:
John A. Coffey

United States Patent Office.

IMPROVED DISTILLING APPARATUS.

JOHN A. COFFEY, OF LONDON, ENGLAND.

Letters Patent No. 60,477, dated December 18, 1866.

---

*The Schedule referred to in these Letters Patent and making part of the same.*

---

TO ALL TO WHOM IT MAY CONCERN:

Be it known that I, JOHN AMBROSE COFFEY, of 17 Gracechurch street, in the city of London, England, consulting engineer, have invented or discovered new and useful Improvements in Distilling Apparatus; and I, the said JOHN AMBROSE COFFEY, do hereby declare the nature of the said invention, and in what manner the same is to be performed, to be particularly described and ascertained in and by the following statement thereof, that is to say:

The object and purpose of my said invention is to improve the construction and arrangement of distilling apparatus for effecting what is known as fractional distillation in such manner that in one and the same apparatus (when supplied with the substance or substances or thing to be distilled) different products, or different qualities of the same product or products, arising at different stages of distillation, may be drawn off at given points of the apparatus, and this without interfering with the progress of distillation or the arrangement of the apparatus for any other product or products at any other stage or stages, whereby I am enabled to effect fractional distillation in a safe and continuous manner in one and the same apparatus. And such, my invention, is specially applicable and valuable in the distillation of petroleum, which consists of several volatile oils and unctuous substances, differing in degrees of volatility, and which, for certain purposes to which they are applied, are required to be more or less completely separated from each other and from a substance of the nature of pitch. In the usual mode of conducting the distillation of petroleum it is put into an ordinary still, to which the heat of a fire is applied, and when the temperature of the liquid in the still rises to about 180° Fahrenheit a volatile oil or spirit comes over, this being the most volatile constituent of the petroleum, or that which has the lowest point of boiling; and as the distillation proceeds, the temperature at which the distillation occurs gradually rises, and distilled products are obtained which are less and less volatile, until at last it reaches 500°, 600°, or more, at which the least volatile products, or those having the highest boiling points, are obtained. But when these heavy oils, as they are called, have been brought over by the application of a high temperature, there remains a residue of thick tar or pitch or coke in the still, which must be removed before a fresh portion of the petroleum can be operated upon. Now, my invention provides efficient means by which the distillation can be continued without the interruption caused by the removal of the residual tar, pitch, and coke from the still, and by which the several fractional products can be obtained simultaneously and continuously. The apparatus and arrangement by which I obtain these results are also applicable and valuable in the distillation of other substances beside petroleum, where several products are required to be obtained by what is called fractional distillation.

As regards the nature of my said invention, whereby I effectuate the objects and purposes aforesaid, I have a boiler, provided with a furnace or fire to heat the same. Or (in lieu thereof) I can adopt gas or other heat generator, and if it be desired to provide for the conduct of the process of distillation with extreme regard to safety from explosion, I can place the furnace or fire in a field or open ground at a distance, and convey the heat through pipes or ducts to the apparatus.

For keeping up the supply of the crude or raw material, or thing to be distilled, I make use of a tank or reservoir, placed at such altitude and position that the crude material to be distilled may (upon acting upon a stop-cock or valve) descend by its own gravity into a coil in the boiler; or it may be conveyed to be circulating, operating, or be operated upon in the apparatus when it is so arranged. This coil I either pass through a pyrometer of great accuracy, or I use such a pyrometer, in connection with the said coil, in the manner shown by the drawing, and hereafter described in reference thereto. By the means of the pyrometer, so placed, in connection as aforesaid, I am enabled to "read off" the exact degree of heat in the boiler with readiness and precision. From or near to the pyrometer the coil is produced or continued, and passes into a continuous fractional distilling chamber, or system of chambers, in direct communication with the boiler. This chamber, or system of chambers, is made up of an arrangement of trays or partitions, in which the coil, laid flat thereon, is supported. The coil is continued from one tray or partition to another tray or partition, throughout the whole series or system, till it reaches the topmost, and there it discharges its contents; and as each tray or compartment is in communication with the one beneath, by means of a duct in the centre or other part thereof, should there be any accumulation of residuary material, or substance not volatilized and passing off by the still-head, it will pass into the trays or partitions in succession, and either be evaporated or volatilized on the partitions or partition of some or one of them, or finally pass into the boiler. Waste material or residuum is discharged from the boiler by a waste pipe or syphon. It should be observed that the material undergoing distillation is contained not only inside the coil but outside it also. The volatilized material or spirit not drawn off at intermediate points passes off by the still-head to the refrigerator or condenser. And from each of the sections or chambers between the trays or partitions aforesaid I have a pipe carried into the lower part of the refrigerator or condenser, or other suitable receptacle for condensing or refrigeration; and this pipe is coiled therein, and surrounded with water or cooling liquid, by which means I can draw off different products or qualities at each of the stages of the said sections, thus effecting continuous fractional distillation.

That the details of my apparatus may be readily understood, I have annexed to this specification a sheet of drawings.

Description of the said Drawings.

Figure 1 is a sectional elevation of the apparatus.

A denotes the boiler, with furnace or fire beneath the same. A', stirrer or agitator to be used therein, (fig. 2, showing plan view thereof.) B, pipe conveying crude material into a coil, C, in the boiler, the material either descending by its own gravity, as aforesaid, or being forced by means of an ordinary force-pump, as shown in the drawing. D, pyrometer, one end of which is in the boiler, the dial being outside thereof. E, distilling chamber, or system of chambers, proceeding from the top of the boiler. $a$ denotes the coil pipes, and $b$ small pipes for discharging refuse from one tray to another; F denoting the trays or partitions on which a flat part of the coil is supported, the section of this part of the coil being shown by the small circles. G, the still-head. H, pipe leading to a refrigerator or condenser, which is dischargeable at the point H'. I, another condenser or refrigerator. K denotes pipes for the distilling chambers or compartments, leading to condensing worms in connection with said pipes K; the said worms being situate in the condenser or refrigerator I aforesaid, and being surrounded with cold water or cooling media. L, drawing-off pipes, with stop-cocks. M, pipe proceeding from the bottom of the boiler, the crude stuff or material then rising in the upright transparent portion thereof, so as to show the level thereof in the boiler.

Figure 2, horizontal section or plan, on line G H of boiler, fig. 1.

Figure 3, plan or horizontal section, on line E F of fig. 1.

Figure 4, plan or horizontal section, on line C D of fig. 1.

Figure 5, plan or horizontal section, on line A B of fig. 1.

If it should be thought desirable, the following modifications may be adopted for the distillation of petroleum or other such like substances:

I have a boiler or heating bath, charged with some of the least volatile of the heavy oils obtained in the distillation of petroleum. Or, in place of this, it may contain a fusible salt, or metal, or any substance which remains liquid at the temperature required to be applied. In the distillation of petroleum the temperature will be between 500° and 600° Fahrenheit. In the boiler or heating bath, and suspended a few inches from the bottom, there is a coil of iron pipe, which, by an extension, communicates with a force-pump and a tank, and another extension of it passes through the distilling chambers. The distilling chambers, which are most conveniently and economically made of cast iron, are all similarly formed, and upon each there is a channel, through which the liquid to be distilled runs in a zigzag direction; and the said extension of pipe produced lies in the bottom of this channel, and after running the entire length of it, passes upward to another, and thus through the whole series. The liquid, running through the channel, passes through an opening and a tube into the chamber beneath, where it enters below the surface of the liquid there, and it thus passes through the whole series of chambers, or through any number of chambers that may be required. In each of these chambers there is a ledge projecting from the sides, a few inches above the surface of the liquid contained in the zigzag channel, and any condensed vapor collected in the groove formed by the ledge passes, together with uncondensed vapor, into a pipe communicating with a refrigerator. The extension pipe, after passing through the channels of the distilling chambers, which are those nearest to the boiler or heating bath, passes into the uppermost chamber of the series, and here it discharges its contents into the zigzag channel of that chamber; and the liquid thus discharged, after running through the channels or heating chambers, or such others as may be made to correspond with these, passes through a pipe into the tank. The crude liquid to be distilled is contained in another tank, and is allowed to run, by its own gravity, through the pipe which passes to and lies in the channels of the upper or heating chambers, and it is then discharged into the zigzag channels of the distilling chambers below, where it undergoes distillation. The boiler or heating bath is to be charged with the liquid which is to be the medium for communicating heat to the heating pipe; and this being heated by the furnace to a temperature of 550° or 600°, the liquid contained in the first-mentioned tank is to be sent, by means of a force-pump, through the coil in the boiler, where it will become heated also, through the heating pipes in the distilling chambers, until, after passing through the open chambers in which the flat coils are placed in the upper or heating chambers, it is finally conveyed back into the tank, to be used over again. This liquid serves as a carrier of heat to the distilling chambers and to the heating chambers. It passes into the lowest of these chambers at its highest temperature, and losing heat as it travels onwards, it enters each succeeding chamber at a lower temperature than that at which it entered the preceding one. When it has thus been reduced to a temperature at which it is no longer capable of volatilizing any of the constituents of the petroleum, it should be made to pass into the heating chambers, and be transferred there to the open channels, where its remaining heat will serve to heat the petroleum running from the tank through the pipe. This petroleum, thus heated, will enter the zigzag channels of the distilling chambers, where, by contact with the hot pipe, it will give off its most volatile parts, which will pass through the tube to the refrigerator. After passing over the whole length of the hot pipe lying in the zigzag channel of the upper distilling chamber, that which remains of the petroleum will pass through the tube into the chamber beneath, where it will be subjected to the action of a higher temperature, and will give off such of its constituents as volatilize at this temperature, which as in the previous instance, will pass to the condenser of this chamber, and will constitute the second fractional product of the process. In this way the petroleum will pass from chamber to chamber, and be exposed to a gradually increased temperature as it proceeds, until it is so far deprived of its volatile parts that it may be allowed to escape into a suitable receptacle in the form of thick tar or fluid pitch. The number of chambers to be used as distilling chambers and as heating chambers, and the rapidity with which the liquid from the tank is made to circulate through the coil and the heating pipe, as well as the quantity of liquid passing from the tank, must be so adjusted that the lowest distilling chamber shall have a temperature of not less than 500°, and the highest distilling chamber a temperature of not less than 100°. In the distillation of other liquids besides petroleum it may be necessary to vary the arrangement, so that the upper distilling chamber shall have the temperature required for the volatilization of the most volatile constituents, and the lowest the temperature required for volatilizing the least volatile of the required products, and these results can be regulated in the manner already indicated.

It will be readily understood that by increasing, within certain limits, the rapidity with which the liquid from the tank is forced through the coil in the heating bath, and made to circulate in the distilling chambers, the amount of heat carried into these will be increased, while by increasing the flow of the liquid from the tank through the apparatus, the heat will be more rapidly absorbed and the temperature of the chambers reduced. The number of chambers used, both as distilling chambers and as heating chambers, may be varied according to the nature of the liquid submitted to distillation and the nature of the required products, the object being to adjust the arrangement so that the liquid to be distilled shall be heated up to near the lowest point of volatilization in passing through the heating chambers. In the distillation of petroleum and other analogous substances, such as coal tar, I prefer to use some of the least volatile of the distilled products of these substances for charging the heating bath, and also for circulating through the coil and heating pipes. These oils, while used for the latter purpose, will be deprived of any of the more volatile oils they may retain, and while used for the former purpose they will give off some of the less volatile of the oils or unctuous products, for the collection of which provision is made. But while in the cases referred to I prefer to operate in the manner indicated, there are other cases in which, as already stated, it may be found advantageous to use a fusible salt, or both together, in the heating bath, and in which either water or steam, used under pressure, or superheated steam, may be made to circulate through the coil and heating pipes. If water or steam be thus used as the heat carrier, it will be necessary to modify the arrangement, to omit the heating chambers at the top of the column, and to let the water or steam pass out from the heating pipe through a valve, by which the pressure, and thereby the heat, may be regulated. In the event of steam being thus used, the force-pump may be omitted, and the steam supplied directly from a steam boiler, either under pressure or otherwise. When heavy oil of petroleum, or other analogous substance, is used in the hot bath, and the same liquid is made to circulate through the coil and pipes, the arrangement may be modified in the following way: The coil may be omitted, and the force-pump may be made to force the liquid from the upper part of the contents of the hot bath through the heating pipes, this liquid returning to the bath, and entering, in its partially cooled state, through a pipe at the bottom.

The *modus operandi* just described applies generally (as far as differences of construction will allow) to the apparatus shown by the drawing, as well as to the modifications of the apparatus lastly described.

What I claim in regard to the above-described invention of improvements in distilling apparatus are the improved constructions and arrangements set forth, in regard to the distillatory portions of such apparatus, it being understood that I do not claim any of the mechanical details thereof *per se* and apart from the purposes of my said invention.

JOHN A. COFFEY.

Witnesses:
F. W. CAMPIN, 4 *Middle Temple Lane, Temple, E. C., London.*
ERNEST DE PASS, 68 *Fleet Street, London.*